United States Patent
Dance (12)

(10) Patent No.: US 11,003,394 B2
(45) Date of Patent: May 11, 2021

(54) MULTI-DOMAIN DATA STORAGE SYSTEM WITH ILLEGAL LOOP PREVENTION

(71) Applicant: Seagate Technology LLC, Cupertino, CA (US)

(72) Inventor: Nicholas James Dance, Boulder, CO (US)

(73) Assignee: Seagate Technology LLC, Fremont, CA (US)

( * ) Notice: Subject to any disclaimer, the term of this patent is extended or adjusted under 35 U.S.C. 154(b) by 40 days.

(21) Appl. No.: 16/457,111

(22) Filed: Jun. 28, 2019

(65) Prior Publication Data

US 2020/0409558 A1    Dec. 31, 2020

(51) Int. Cl.
*G06F 3/06*    (2006.01)

(52) U.S. Cl.
CPC .............. *G06F 3/067* (2013.01); *G06F 3/061* (2013.01); *G06F 3/0635* (2013.01); *G06F 3/0658* (2013.01)

(58) Field of Classification Search
None
See application file for complete search history.

(56) References Cited

U.S. PATENT DOCUMENTS

| 6,339,423 | B1 | 1/2002 | Sampson et al. |
| 7,937,757 | B2 | 5/2011 | Focke et al. |
| 8,082,589 | B2 | 12/2011 | Orion et al. |
| 8,090,592 | B1 | 1/2012 | Goodall et al. |
| 8,402,196 | B2 | 3/2013 | Davis et al. |
| 9,049,195 | B2 | 6/2015 | Sack et al. |
| 2003/0037061 | A1 | 2/2003 | Sastri et al. |
| 2013/0315058 | A1* | 11/2013 | Otaka ................ G06F 11/2005 370/228 |
| 2019/0245923 | A1* | 8/2019 | Williams ................ G06F 3/065 |

* cited by examiner

*Primary Examiner* — Scott C Sun
(74) *Attorney, Agent, or Firm* — Hall Estill Attorneys at Law

(57) ABSTRACT

A data storage system can employ multiple concurrent domains with data storage devices each having a single data port. The data storage system may connect a number of hosts to a data storage device via a network controller, an expander, and an expander module with the data storage device having a single data port. A first data domain and a second data domain are each established from the network controller to the data storage device with the first data domain being independent of the second data domain. At least one illegal loop can be identified between the first data domain and the second data domain with the expander module and subsequently corrected with the expander as directed by the expander module.

20 Claims, 3 Drawing Sheets

MULTI-DOMAIN DATA STORAGE SYSTEM WITH ILLEGAL LOOP PREVENTION

SUMMARY

A data storage system, in accordance with some embodiments, connects a number of hosts to a data storage device via a network controller, an expander, and an expander module with the data storage device having a single data port. A first data domain and a second data domain are each established from the network controller to the data storage device with the first data domain being independent of the second data domain. At least one illegal loop is identified between the first data domain and the second data domain with the expander module and subsequently corrected with the expander as directed by the expander module.

Other embodiments of a data storage system connect a number of hosts to a data storage device via a network controller, a first expander, and an expander module with the data storage device having a single data port. A first data domain and a second data domain are each established from the network controller to the data storage device with the first data domain being independent of the second data domain. At least one illegal loop is predicted between the first data domain and the second data domain with the expander module prior to being corrected with the first expander as directed by the expander module.

A data storage system has, in various embodiments, a number of hosts connected to a data storage device via a network controller, an expander, and an expander module with the data storage device having a single data port. The expander module is configured to establish a first data domain and a second data domain from the network controller to the data storage device with the first data domain being independent of the second data domain, identify an illegal loop between the first data domain and the second data domain, and correct the identified illegal loop.

These and other features which may characterize assorted embodiments can be understood in view of the following detailed discussion and the accompanying drawings.

DETAILED DESCRIPTION

Without limitation, the various embodiments disclosed herein are generally directed to a distributed data storage system employing an intelligent expander module that optimizes performance in data storage devices having a single data port.

Over time, data storage devices have become more sophisticated with greater data storage capacity, faster data access speeds, and smaller form factors. The capabilities of modern data storage devices allow for a diverse range of distributed data storage systems that cater to one or more computing needs of a user. However, the use of sophisticated data storage devices can create complex logical, and physical, configurations that provide a wide range of capabilities, but with limited performance. Hence, there is an industry, and consumer, interest in providing sophisticated data storage capabilities with minimally complex devices.

Accordingly, various embodiments optimize data storage devices having single data input, such as a serial attached small computer system (SAS) interface or serial ATA (SATA) port. The incorporation of an expander module into a distributed data storage system allows for multiple separate logical domains to be utilized concurrently, despite a downstream data storage device only having a single data port. The expander module can provide self-configuration capabilities that identifies connected devices and cures potential, and existing, illegal domain loops. As a result, logical domain isolation is achieved that allows for multiple different data streams to pass to/from a single data port data storage device.

Figure 1:
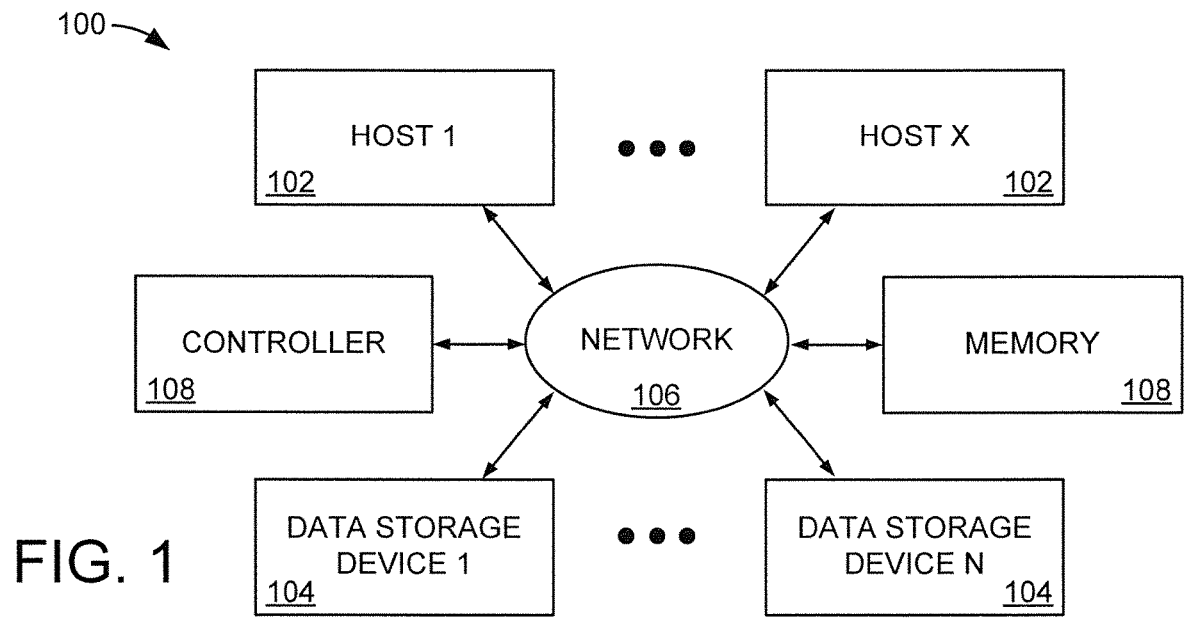
FIG. 1 provides a functional block representation of an example distributed data storage system in which various embodiments can be practiced.

FIG. 1 conveys a functional block representation of an example distributed data storage system 100 in which assorted embodiments can be practiced. A number (X) of remote hosts 102 can be connected to a number (N) of data storage devices 104 via a network 106 that consists of one or more wired and/or wireless signal pathways. The network 106 can further consist of control components, such as a controller 108, memory 110, and assorted distribution circuits, to conduct various data storage, retrieval, distribution, and maintenance with the assorted data storage devices 104. It is contemplated, but not required, that the network 106 can connect one or more hosts 102 with network components, such as a node, server, repeater, and switch, that provides computing and/or data storage capabilities to the system 100.

Figure 2:
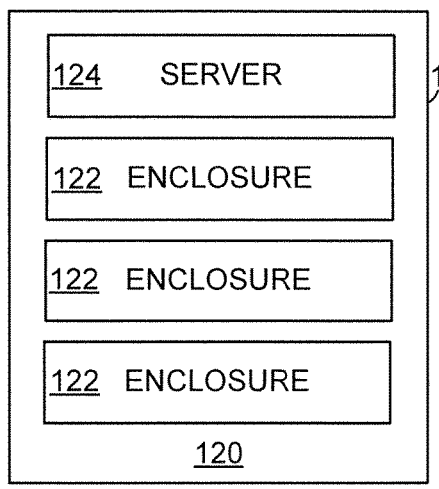
FIG. 2 is a block representation of a portion of an example data storage system arranged in accordance with some embodiments.

FIG. 2 displays a block representation of portions of an example data storage assembly 120 that can be incorporated into the distributed data storage system 100 of FIG. 1. While a data storage device 104 can be a single memory, such as a single rotating hard disk drive (HDD) or solid-state drive (SDD), some embodiments arrange a data storage device 104 as a collection of multiple separate memories/drives. The data storage assembly 120 depicts an example multi-memory collection where a number of data enclosures 122 are accessed via a local server 124.

It is contemplated that each data enclosure 122 contains one or more separate memories/drives positioned within a common case to allow for efficient power, control, and cooling. Having individual memories/drives in a single enclosure 122 further allows for efficient removal, installation, and swapping of memories/drives upon failure, error, filled storage capacity, or removal from service. Any number of data enclosures 122 can be individually, and concurrently operated as directed by the local server 124 and any upstream data control, such as the network controller 108 and/or hosts 102.

In some embodiments, multiple enclosures 122 are physically positioned within a single rack 126, which allows for efficient space utilization and cooling. One or more control circuits, such as the server 124, a switch, a power distribution hub, and a router, can be physically located within the rack 126 along with the memories/drives that the control circuits control. The physical location of a server 124, however, does not limit the ability of control circuits to be connected to, and direct data operations with, memories/drives positions outside of the rack 126 that houses the server 124.

Figure 3:
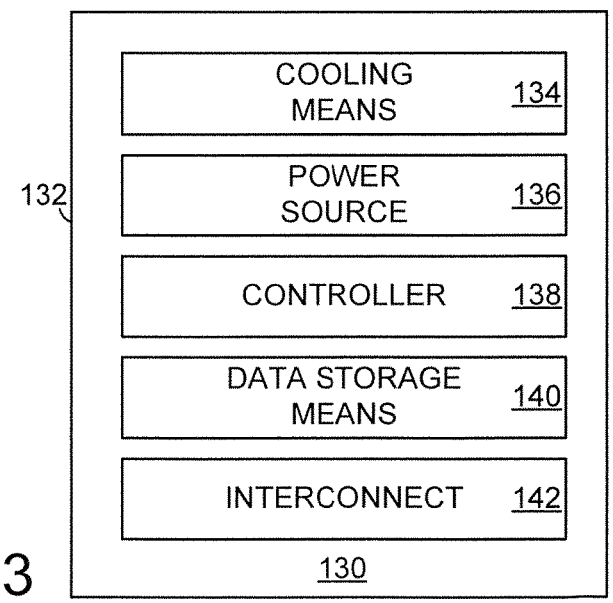
FIG. 3 depicts a block representation of a portion of an example data storage system configured in accordance with at least one embodiment.

FIG. 3 generally conveys a block representation of an example data storage enclosure 130 that can be employed in the data storage assembly 120 of FIG. 2. The enclosure 130 has a unitary housing 132 that is vented to allow for convective cooling via one or more cooling means 134, such as a fan, liquid radiator, or combination thereof. At least one local power source 136 can be incorporated into the housing 132 to supply electrical power to various electrical components contained in the housing 132, such as a local controller 138 and various data storage means 140, such as HDD, SDD, or combinations thereof. However, the local power source 136 is not required and power may be distributed to the assorted aspects of the enclosure 130 without having power generation, regulation, or distribution hardware physically located within the housing 132.

As shown in FIG. 3, a local enclosure controller 138 can be connected to a plurality of data storage means 140 via various interconnects 142, such as a midplane, bus, or other data pathway. It is contemplated that the interconnects 142 can be SAS, SATA, optical, or Peripheral Component Interconnect Express (PCIe) and may have individual controllers directed to the passage of data through the respective interconnect 142. Such interconnect control may be handled by the local enclosure controller 138 or by separate control circuitry. The configuration of the data storage enclosure 130 allows for efficient distribution of data via the local controller 138 while maintaining a minimal physical footprint for the multitude of data storage means 140. Such efficiencies can be utilized to distribute data to, and from, multiple different hosts without a degradation of data storage performance.

The relatively high data capacity and data storage performance provided by the data storage enclosure 130, and likewise with the data storage assembly 120 comprising multiple enclosures, affords data storage capabilities conducive to sophisticated distribution of data, such as with redundant array of independent drives/devices (RAID) principles, where data can be deliberately stored redundantly, mirrored, and striped utilizing multiple separate data storage means 140 of one or more data storage enclosures 130 and assemblies 120. The ability to employ various RAID levels provides enhanced data integrity in combination with heightened data security and recovery via generated parity information.

Figure 4:
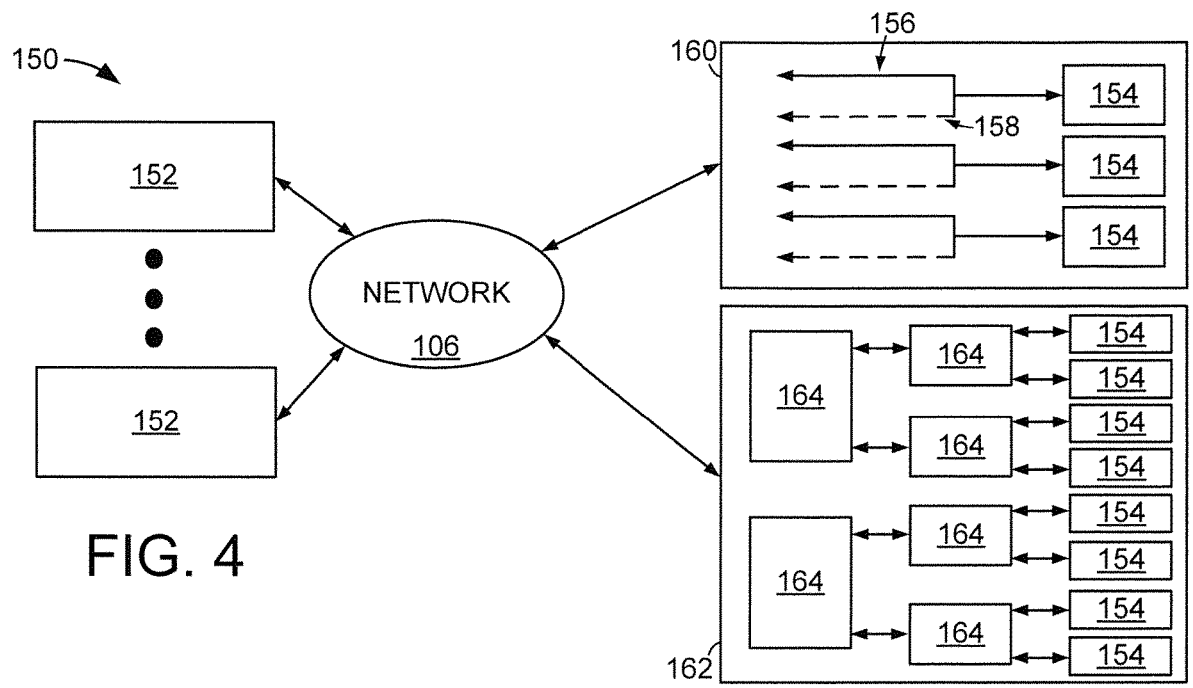
FIG. 4 shows a functional block representation of portions of an example data storage system employed in accordance with various embodiments.

A functional block representation of an example data storage system 150 is illustrated in FIG. 4. The system 150 can employ one or more data storage devices 102, such as in a data storage enclosure 130 and/or a data storage assembly 120, to distribute data in accordance with RAID, or other data distribution, protocol. The system 150 can service one or more data initiators 152 with one or more data storage units 154 via a network 106.

A data storage unit 154 can be any data storage type, data capacity, physical size, and data access speed, but, in some embodiments, is a HDD or SDD with multiple data ports that allow for multiple data domains to be concurrently streaming data to/from a single data storage unit 154, as represented by solid arrow 156 and segmented arrow 158. The use of multiple data domains can increase the data transfer performance of the system 150, but with increased interconnection complexity associated with servicing multiple domains.

While maintaining physically and logically separate domain interconnections can efficiently provide multiple domains to a single data storage unit 154, separate interconnections require multiple data ports, busses, or other input for each data storage unit 154. For example, data storage enclosure 160 shows how multiple domains can be employed for each data storage unit 154 with more than one data port while data storage enclosure 162 shows how datapath expanders 164 can be utilized to distribute data domains to the multiple data ports of the respective data storage units 154.

The use of multiple data port data storage units 154 can be expensive in terms of physical size, unit cost, and internal complexity. Hence, data storage units 154 with a single data port are generally more desirable for distributed data storage systems 150, but has traditionally forced a compromise between the use of multiple data domains for a single data storage unit 154 and the use of single data port data storage units 154. Consequently, various embodiments are directed to providing multiple data domain functionality for data storage units/devices 154 having a single data port.

Figure 5:
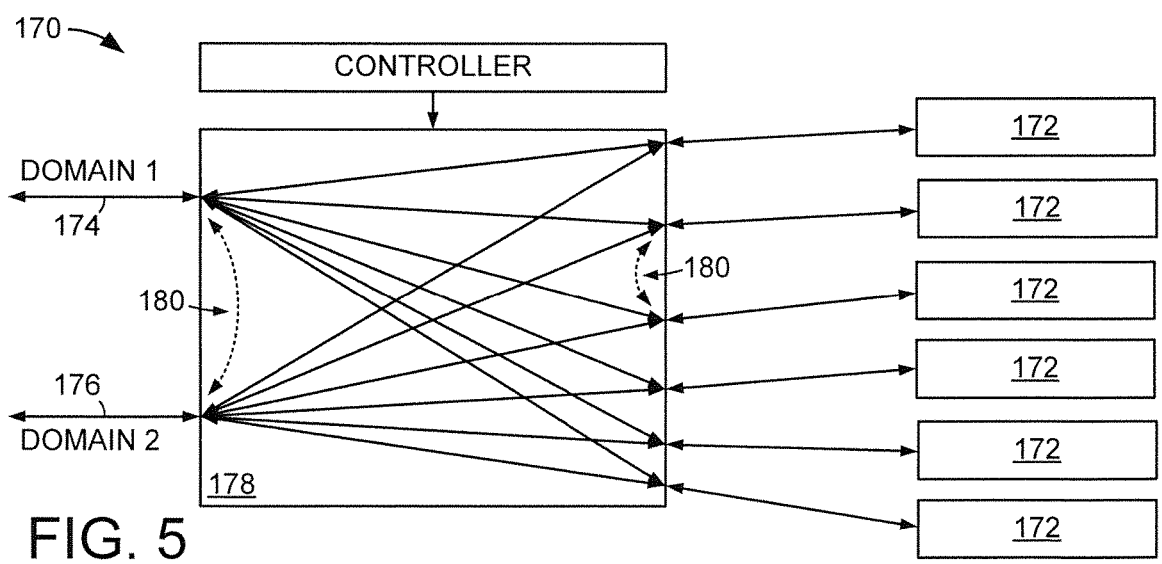
FIG. 5 illustrates portions of an example data storage system utilized in accordance with some embodiments.

FIG. 5 displays a line representation of a portion of an example data storage system 170 that employs single port data storage devices 172 in accordance with some embodiments. Although not required or limiting, a first SAS data pathway 174 and a second SAS data pathway 176 can each connect to a SAS expander 178 that serves to logically distribute data to the respective data storage devices 172 as directed by one or more upstream controllers, such as controller 138, controller 108, and/or host 102.

It is contemplated that the expander 178 consists of processing capabilities that allow for localized distribution of data, but such local intelligence would increase system complexity and likely slow data access performance to/from the respective devices 172. Thus, the expander 178 executes data distribution as directed by upstream controllers without local circuitry altering the timing, destination, or domain of data entering the expander 178 via the respective pathways 174/176.

The rather simple execution of data distribution based on upstream control directives can provide efficient expander 178 operation, but can also result in domain loops that jeopardize the integrity of the separate data domains. In the non-limiting example shown in FIG. 5, the expander 178 can experience a first critical loop 180 as data flows from one pathway 174/176 to the other before being distributed to the data storage devices 172. This loop can be characterized as an upstream domain breach as the expander effectively confuses the domain of data prior to being distributed.

The expander 178 may also experience a second critical loop 182 as data of different domains is inadvertently distributed between data storage devices 172. The second critical loop 182 can be characterized as a downstream domain breach as the expander effectively confuses data domains during, or after, distribution. As can be appreciated, the loss of domain integrity can be problematic for system 170 operation, particularly large-scale data storage systems where domain breaches are difficult to identify, proactively prevent, or rectify. As such, the simple implementation of a physical, or logical, data pathway expander 178, such as a multiplexer, switch, or bridge, cannot prevent loops 180/182 to provide domain integrity for single data port data storage devices 172.

Accordingly, expander intelligence is implemented into a data storage system 170, in various embodiments, to prevent critical loops 180/182 and maintain data domain integrity despite having a single data port in which to pass data to/from the respective data storage devices 172 of a system. The use of an expander module in accordance with some embodiment provides multiple reliable data domains for data storage devices 172 with a single data port, as opposed to multiple separate data ports, which reduces the system 170 complexity associated with multiple physical expanders, such as shown in enclosure 162, without adding data pathway logic that can correspond with system 170 data storage density and cost penalties.

Figure 6:
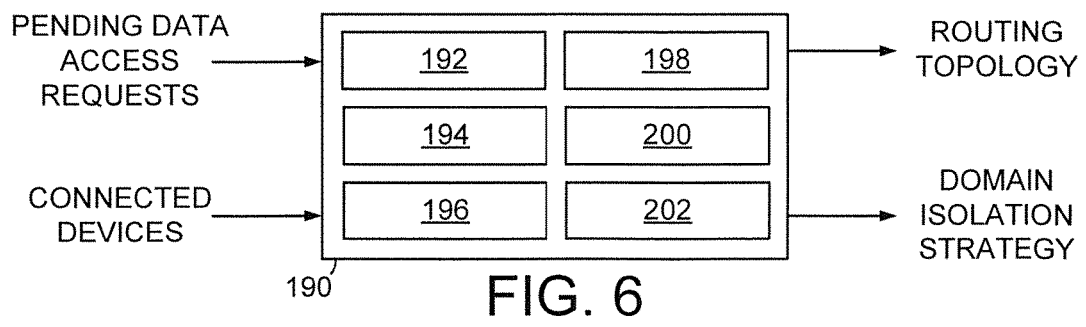
FIG. 6 conveys an example expander module that can be employed in a data storage system in assorted embodiments.

FIG. 6 displays a block representation of an example expander module 190 that can be employed in a data storage system, in accordance with assorted embodiments, to provide reliable multi-domain operation for data storage devices having a single data port. The expander module 190 can be implemented anywhere along a data pathway between a host and a data storage device, but in some embodiments, is positioned downstream of a network controller, such as within a data enclosure, a rack server, or in an individual data storage device.

The expander module 190 can utilize an independent controller 192, such as a microprocessor, application specific integrated circuit (ASIC), or other programmable circuitry. It is contemplated that the expander module 190 replaces, or supplements, a local controller 192 with the controller directing activity of other portions of a data storage system, such as a network controller 108, server controller, enclosure controller, or data storage device controller. Such controller flexibility allows the expander module 190 to be relatively lightweight, logically, while providing multi-domain generation and maintenance to one or more connected data storage devices.

A domain circuitry 194 can be configured to maintain multiple independent data domains to each connected data storage device having a single data port. It is contemplated that the domain circuitry 194 operates alone to generate a domain isolation strategy that is executed to prevent loops 180/182 by adapting to the inputted number, and type, of connected devices and pending data access requests generated from upstream hosts. However, some embodiments configure the domain circuitry 194 to operate in cooperation with the local controller 192 to intelligently react to inputted information, predict future situations where loops can occur, and proactively prevent such future loop situations in a developed domain isolation strategy.

The domain circuitry 194 can comprises one or more loop circuits that identify existing, inevitable, and future loops based on information obtained from downstream data storage devices in combination with the pending data access request queue. In accordance with some embodiments, a loop circuit can identify actual and future loops that is processed by the domain circuitry 194 to generate the domain isolation strategy that can be carried out by various aspects of the expander module 190 and the connected data storage system.

In order to actually correct for an actual, or predicted, loop, route circuitry 196 can alter the signal pathway through an expander. That is, the route circuitry 196 can carry out the domain isolation strategy by changing how signals pass from the upstream network to the downstream selected data storage device(s). It is contemplated that the route circuitry 196 maintains a map of existing, and previously utilized, data pathway routes, which increases execution efficiency for domain isolation strategies. The combination of the route circuitry 196 with the domain circuitry 194 provides optimized data pathway configurations that adapt reactively, and proactively, to changes in data storage device operation, such as errors, failures, newly added devices, or removed devices, as well as carrying out an existing domain isolation strategy.

The operation of the expander module 190 will be conveyed by way of a non-limiting example where a single data port, such as SAS or SATA ports, data storage device to be incorporated into a data storage system with two independent and active data paths (domains). The ability to establish, maintain, and independently access two data domains allows data storage devices that utilize multiple data streams, such as dual actuator HDDs, to be efficiently employed without degrading system data storage performance due to occupying a greater portion of the available data bandwidth.

The configuration of the expander module 190 allow it to be implemented into an existing pathway expander, such as a SAS expander found in SAS/SATA data storage enclosures to provide access to a single data port data storage device from two separate SAS domains concurrently. It is noted that under the operating rules defined by a SAS protocol layer (SPL), physical or logical bridging of two SAS domains would expose the SAS protocol to illegal loops. Accordingly, the expander module 190 is configured to prevent such loops using knowledge of the physical topology of a distributed data storage system to ensure that SAS traffic does not cross between data domains while end data storage devices are visible to initiators in each respective data domain.

In accordance with some embodiments, multi-domain SAS loop breaking is performed with an SAS edge-expander device by manipulating the serial management protocol (SMP) responses with a SMP circuit 198 during SAS discovery such that the connected data storage devices, and SAS routes, available in a first SAS domain are not discoverable by upstream devices in a second SAS domain, and vice-versa. In addition to preventing crossover of discovery traffic between the two SAS domains, broadcast traffic is also prevented while allowing all downstream data storage devices are visible to each available SAS domain.

The expander module 190 can have one or more discover circuits 200 that utilize a phy bitmap 202 to establish, and maintain, independent data domains to a data storage device having a single data port. Such hardware allows upstream phys on a SAS expander to be table routed, which is required due to two subtractive routed ports are not possible. As a result, the expander module 190 provides self-configuration that fully populates its own expander route table with routes discovered in multiple different data domains via at least the route circuitry 196 so that data storage device traffic is successfully routed upstream. It is only when responding to SMP requests for a particular data domain that the expander module 190 hides possible data routes involved with other data domains.

The expander module 190 does not require physical isolation of different SAS domains, which allows it to be retrofitted into existing SAS expander devices. Instead, the expander module 190 relies on the manipulation of SAS discovery traffic so that the upstream devices of a distributed data storage system in a local domain are unaware of upstream routes that connect into other domains. As such, issuing SAS traffic to partner domain devices via a local domain is prevented.

As a non-limiting example, the expander module 190 engages in SAS discovery to provide reliable, independent data domains. The discover circuit 200 can direct the operation of SMP discover and discover list functions to discover devices connected to a SAS phy belonging to an expander device. The responses to these functions can be modified to hide attached devices when a discover request is received on an ingress phy marked as being a subcomponent of an upstream port and when a discover request is accessing discovery information for a phy that is a subcomponent of an upstream port belonging to a different SAS domain to the ingress phy. Under these conditions, the SMP discover function response shall return a phy vacant result and the discover list function response shall return a descriptor result of phy vacant for the corresponding upstream phy.

The expander module 190 may utilize an SMP report route information function to discover addresses of devices that are accessible behind a given expander phy. For domain isolated phys, the routes available on one upstream port must not be made visible to SMP requests received on an upstream port in a different SAS domain. The expander module 190 responds to a route information request with a phy vacant result when the route information request is received on an ingress phy marked as eing a subcomponent of an upstream port and when the route information request is accessing route information for a phy that is a subcomponent of an upstream port belonging to a different SAS domain to the ingress phy.

An SMP report expander route table list function can be carried out by the expander module 190 to list routes for all phys connected to an expander. Provided with a valid request, an expander shall respond successfully with a valid route entry list unless the table list request is received on an ingress phy marked as being a subcomponent of an upstream port, the route descriptor entry of the phy bitmap 202 has a 1 value that is associated with a phy that is a subcomponent of an upstream port belonging to a different SAS domain to the ingress port, and the route descriptor entry does not have a 1 value for any other phys that do not belong to an upstream port belonging to a different SAS domain to the ingress phy. It is noted that if a route descriptor entry has a 1 value for any other phys that do not belong to an upstream port of a different SAS domain than the ingress phy, the descriptor shall be reported with bits corresponding with the hidden upstream phy having a 0 value.

In addition to the SMP functions used for SAS discovery, the expander module 190 can engage in phy-based SMP functions. For instance, the expander module 190 will return a phy vacant result if a request is received on an ingress phy marked as being a subcomponent of an upstream port and if a request is accessing state for a phy that is a subcomponent of an upstream port belonging to a different SAS domain than the ingress phy.

Through the use of SMP functions, the expander module 190 can prevent loop traversal during SAS discovery, but it is also necessary to prevent broadcast primitive and frame propagation between upstream SAS domains, which prevents perpetual broadcast propagation due to physical SAS loops that may be created during multi-domain operation to a single data port data storage device. The expander module 190 can originate a broadcast with a phy when a SAS topology, and/or system operating parameter, change is detected or if a broadcast primitive or frame is received from another device. When a phy originates a broadcast, it is propagated internally within the expander module 190 and physical expander to other phys that are required to forward the broadcast onward.

In the event a broadcast is originated by a phy not belonging to an upstream SAS port, the broadcast may be forwarded to all upstream ports, provided it is permitted by normal SPL broadcast propagation rules. When a broadcast is originated by a phy belonging to an upstream SAS port, the broadcast may not be forwarded to phys belonging to any other upstream SAS port, otherwise normal SPL broadcast propagation rules apply.

The configuration of the expander module 190 allows for self-configuration over time, as subtractive routing cannot be used for more than a single upstream port. For SAS expanders that can detect, and/or isolate, domain loops as part of a self-configuration, such capability may be disabled by the expander module 190 to allow external topologies to be devised that expose two independent paths to the same expander device, even though no risk for actual SAS looping exists.

It is contemplated that a single port data storage device can receive multiple independent data streams, and domains, by utilizing one or more port-multiplier devices. For instance and in no way required or limiting, an active-passive multiplexer, active-active multiplexer, or SAS-SATA bridge can be positioned on interposer boards between a network controller and a data storage device.

Figure 7:
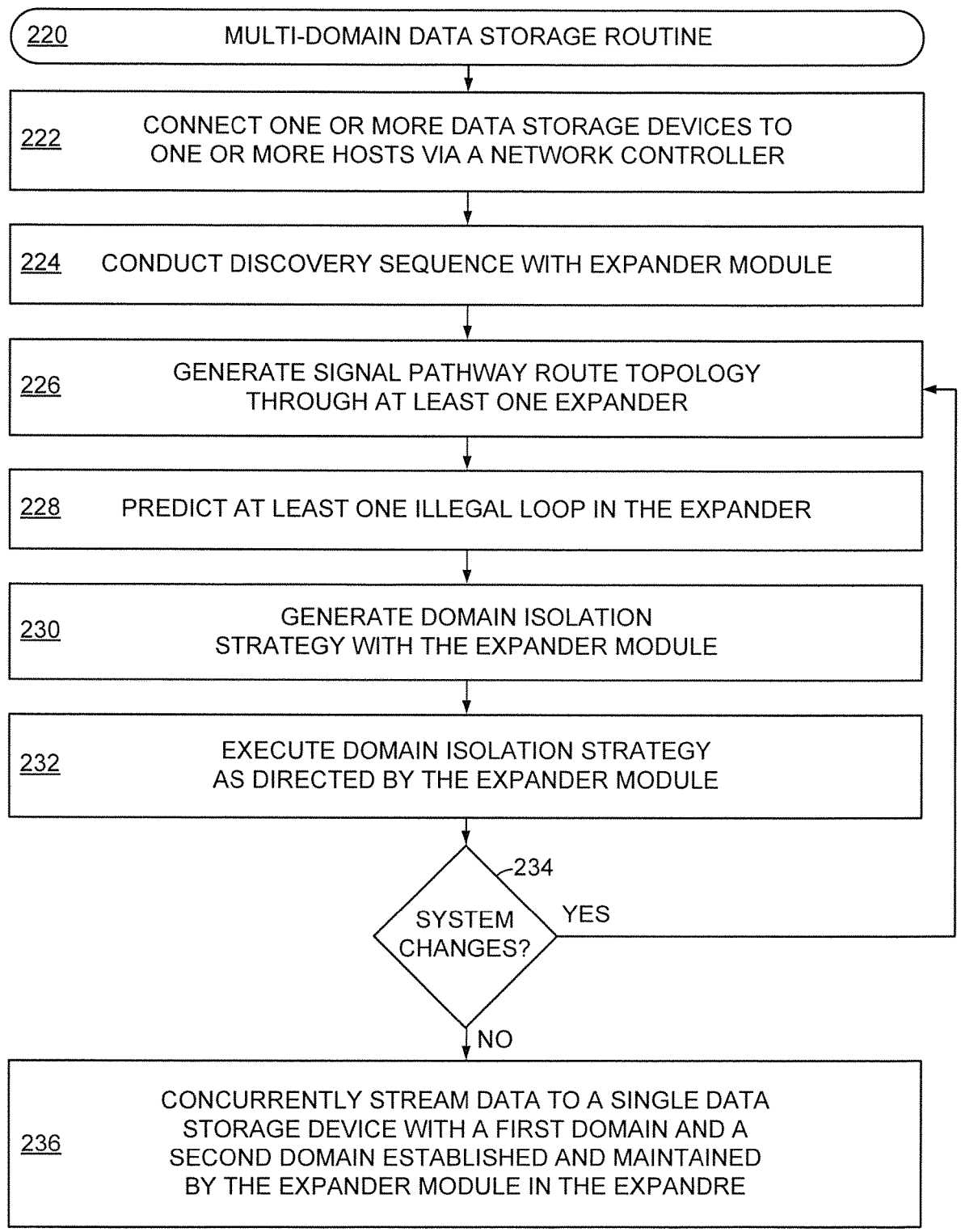
FIG. 7 is an example multi-domain data storage routine that can be carried out with the respective embodiments of FIGS. 1-6.

FIG. 7 displays an example multi-domain data storage routine 220 that can be carried out with the assorted embodiments of FIGS. 1-6. The routine 220 can begin with the connection of one or more data storage devices with one or more hosts in step 222. At least one connected data storage device has a single port for data input/output. An expander module then conducts a discovery sequence in step 224 that involves evaluating at least the connected devices and data access requests to generate a signal pathway route topology in step 226.

The discovery sequence undertaken in step 224 can involve a number of different functions over time, such as phy-based and/or non-phy-based SMP functions described in association with the expander module 190. The route topology can be utilized by the prediction circuit of the expander module to predict illegal loops in step 228 that could occur by operating multiple domains to one or more connected data storage devices. The prediction of illegal data pathway loops is accounted for in a domain isolation strategy generated by the expander module in step 230 and subsequently executed in step 232.

A domain isolation strategy may consist of one or more proactive, or reactive, actions, such as conditions to return a phy vacant result, list exclusions, or route descriptor values, that correspond with independent reliable data domains streaming to a single data storage device data port. The execution of the domain isolation strategy in step 232 can occur at a single moment in time or over the course of a time period to carry out actions concurrently and/or sequentially.

While the execution of a single domain isolation strategy can occur over time, various embodiments allow for the adaptation of a domain isolation strategy in response to encountered, induced, and predicted changes in the physical topology and performance of a distributed data storage system. Decision 234 utilizes the expander module to evaluate if a system change is detected or predicted. The evaluation of decision 234 may occur continuously, sporadically, or randomly as part of a predetermined routine or a response to a system event, such as connection of a device, removal of a device, failure, error, or change in system capability.

If a change has occurred, or is reliably predicted, the routine 220 returns to step 226 is revisited to map the altered system route topology and generate a new domain isolation strategy. In the event decision 234 has no current, or pending, system changes, step 236 proceeds to utilize independent data domains to pass signals/data to at least one data storage device. As an example, step 236 can concurrently utilize a first domain to pass control data for a first actuator of a data storage device and a second domain to pass control data for a second actuator of the same data storage device. Such dual-actuator device capability with a single device data port can allow for complex data storage operation without the need for port multiplier devices that can induce illegal loops and degraded data storage performance.

Through the various embodiments of a multi-domain system described herein, SAS and SATA data storage devices with a single data port can receive independent data streams in concurrent domains. The incorporation of an intelligent expander module adds no logic to the data path between a network controller and a data storage path, which mitigates complexity, density, and cost. The use of an expander module with one or more expanders provides true active-active access to a single data port data storage device, unlike active-passive multiplexing. The expander module can be operated without in-band or out-of-band extensions performing data storage device path switching. As such, the various embodiments provide intelligent expander operation that does not add interop complexity.

What is claimed is:

1. A method comprising:
   connecting a number of hosts to a data storage device via a network controller, an expander, and an expander module, the data storage device having a single data port;
   predicting at least one illegal loop with the expander module;
   creating a domain isolation strategy with the expander module; and
   executing, with the expander module, the domain isolation strategy to manipulate a serial management protocol during discovery of the data storage device proactively to establish a first data domain from the network controller to the data storage device through the expander and to establish a second data domain from the network controller to the data storage device through the expander, the first data domain being independent of the second data domain and free from the at least one predicted illegal loop.

2. The method of claim 1, wherein the first data domain and second data domain operate concurrently.

3. The method of claim 1, wherein the at least one illegal loop is present in the expander.

4. The method of claim 3, wherein the at least one illegal loop is present in an upstream side of the expander.

5. The method of claim 4, wherein the upstream side is between the network controller and a downstream side of the expander.

6. The method of claim 3, wherein the illegal loop is present in a downstream side of the expander.

7. The method of claim 1, wherein the single data port is a serial attached small computer system interface.

8. The method of claim 1, wherein the single data port is a serial ATA interface.

9. The method of claim 1, wherein the expander module comprises a discovery circuit that executes at least one serial management protocol (SMP) function and at least one phy-based SMP function.

10. A method comprising:
    connecting a number of hosts to a data storage device via a network controller, a first expander, and an expander module, the data storage device having a single data port;
    establishing a first data domain from the network controller to the data storage device;
    establishing a second data domain from the network controller to the data storage device, the first data domain being independent of the second data domain;
    predicting an illegal loop between the first data domain and the second data domain with the expander module; and
    correcting the identified illegal loops through the first expander by manipulating a serial management protocol to make at least one route through the first expander not discoverable as directed by the expander module.

11. The method of claim 10, wherein the illegal loop is predicted by a prediction circuit of the expander module.

12. The method of claim 10, wherein the data storage device is positioned in a data enclosure with a server and at least one other data storage devices.

13. The method of claim 12, wherein the expander module is present in the server.

14. The method of claim 12, wherein the expander is positioned within the data enclosure.

15. The method of claim 10, wherein a second expander is connected to the expander module, the first expander and a host of the number of hosts.

16. The method of claim 15, wherein the second expander has a matching configuration as the first expander.

17. The method of claim 15, wherein the second expander has a different configuration than the first expander.

18. The method of claim 15, wherein the second expander is connected to a third expander.

19. A system comprising a number of hosts connected to a data storage device via a network controller, an expander, and an expander module, the data storage device having a single data port, the expander module configured to establish a first data domain and an independent second data domain from the network controller to the data storage device through the expander, identify an illegal loop between the first data domain and the second data domain, and proactively correct the identified illegal loop by populating a route table for the expander with routes discovered in multiple different domains by the expander module.

20. The system of claim 19, wherein the data storage device has a first actuator and a second actuator.

* * * * *